(12) United States Patent
Kim

(10) Patent No.: US 9,639,279 B2
(45) Date of Patent: May 2, 2017

(54) APPARATUS AND METHOD FOR PROCESSING DATA IN TERMINAL

(71) Applicant: Samsung Electronics Co., Ltd., Suwon-si, Gyeonggi-do (KR)

(72) Inventor: Ho-Tae Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 297 days.

(21) Appl. No.: 14/202,352

(22) Filed: Mar. 10, 2014

(65) Prior Publication Data

US 2014/0258673 A1   Sep. 11, 2014

(30) Foreign Application Priority Data

Mar. 11, 2013 (KR) .................. 10-2013-0025686

(51) Int. Cl.
 *G06F 12/00* (2006.01)
 *G06F 3/06* (2006.01)
 *G06F 9/445* (2006.01)

(52) U.S. Cl.
 CPC ............ *G06F 3/0611* (2013.01); *G06F 3/064* (2013.01); *G06F 3/0673* (2013.01); *G06F 9/445* (2013.01)

(58) Field of Classification Search
 CPC ...... G06F 3/0604; G06F 3/0671; G06F 3/0638
 See application file for complete search history.

(56) References Cited

U.S. PATENT DOCUMENTS

| | | | | |
|---|---|---|---|---|
| 4,835,686 A | * | 5/1989 | Furuya ................. | G06F 3/0601 711/113 |
| 5,778,383 A | * | 7/1998 | Grisar ................... | G06F 9/50 |
| 6,073,232 A | * | 6/2000 | Kroeker ................ | G06F 3/0607 713/1 |
| 2010/0070689 A1 | * | 3/2010 | Lee ...................... | G06F 3/0613 711/103 |

* cited by examiner

*Primary Examiner* — Larry Mackall
(74) *Attorney, Agent, or Firm* — Jefferson IP Law, LLP

(57) ABSTRACT

An apparatus and a method for processing data in a terminal are provided. The method includes when a specific program including a specific extension is stored, identifying addresses representing a position of specific data having the specific extension in an entire storage space, initializing the specific program based on the identified addresses, and generating an address table based on the identified addresses, and storing the generated address table.

11 Claims, 5 Drawing Sheets

| NAME OF SPECIFIC DATA | ADDRESS INFORMATION | |
|---|---|---|
| a.jpg | a.0000 | a.FFFF |

| NAME OF SPECIFIC DATA | ADDRESS INFORMATION | |
|---|---|---|
| b.jpg | a.0000<br>a.CCCC | a.BBBB<br>a.FFFF |

APPARATUS AND METHOD FOR PROCESSING DATA IN TERMINAL

PRIORITY

This application claims the benefit under 35 U.S.C. §119(a) of a Korean patent application filed on Mar. 11, 2013 in the Korean Intellectual Property Office and assigned Serial No. 10-2013-0025686, the entire disclosure of which is hereby incorporated by reference.

BACKGROUND OF THE INVENTION

1. Field of the Invention

The present invention relates generally to a terminal. More particularly, the present invention relates to an apparatus and a method for processing data in a terminal.

2. Description of the Related Art

A terminal, such as a smart phone, a tablet Personal Computer (PC), a set-top box, and the like, provides a user with various useful functions through various applications. Accordingly, the terminal has become a device that enables a user to use various types of information by providing various functions. In order to provide the various functions, the terminal stores various programs configured in various applications in a storage unit.

To support these functions, the terminal identifies a location of data related to a specific program on a secondary memory device when executing the specific program, and transmits the identified data to a main memory device. However, it takes a predetermined time to load the specific program, thereby causing a delay when executing the program.

Accordingly, there is a need for an improved apparatus and method for minimizing a delay time in a terminal when executing a program.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for processing data in order to minimize a delay when executing a program in a terminal.

Another aspect of the present invention is to provide an apparatus and a method for processing data by using an address table in order to minimize a delay when executing a program.

In accordance with an aspect of the present invention, an apparatus for processing data in a terminal is provided. The apparatus includes a main memory device, and a secondary memory device configured to, when a specific program including a specific extension is stored, identify addresses representing a position of specific data having the specific extension in an entire storage space, initialize the specific program based on the identified addresses, generate an address table based on the identified addresses, and store the generated address table.

In accordance with another aspect of the present invention, a method of processing data in a terminal is provided. The method includes, when a specific program including a specific extension is stored, identifying addresses representing a position of specific data having the specific extension in an entire storage space, initializing the specific program based on the identified addresses, and generating an address table based on the identified addresses, and storing the generated address table.

Exemplary embodiments of the present invention provide an apparatus and method of processing data in a terminal, thereby achieving an effect of minimizing a delay time for execution of a program. Further, exemplary embodiments of the present invention provide an apparatus and method of processing data by using an address table in a terminal, thereby achieving an effect of minimizing a delay time for execution of a program.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 3A and 3B are diagrams illustrating a format of an address table according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A terminal according to an exemplary embodiment of the present invention includes both a portable terminal and an electronic device of which portability is inconvenient. Here, the electronic device having inconvenient portability may be a personal computer, while the portable terminal is an easily portable electronic device such as a video phone, a mobile phone, a smart phone, an International Mobile Telecommunication 2000 (IMT-2000) terminal, a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, an E-Book, a portable computer (notebook computer, a tablet computer), a digital camera, and the like.

Figure 1:
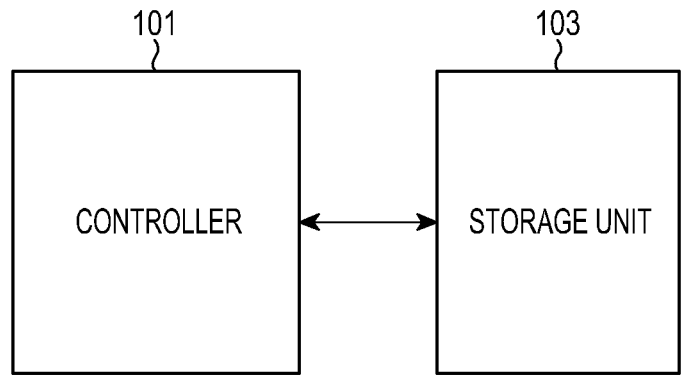
FIG. 1 is a block diagram of a terminal according to an exemplary embodiment of the present invention.

FIG. 1 is a block diagram of a terminal according to an exemplary embodiment of the present invention.

Referring to FIG. 1, the terminal includes a controller 101 and a storage unit 103.

The controller 101 performs a function of controlling a general operation of the terminal. In an exemplary implementation, the controller 101 stores data received from an external device through wired/wireless communication in the storage unit 103. Furthermore, when execution of a specific program is requested, the controller 101 receives data related to the specific program from the storage unit 103 and processes the received data.

When the data received from the external device is stored or the execution of the specific program is requested according to the control of the controller 101, the storage unit 103 detects the data related to the specific program among pre-stored data and transmits the detected data to the controller 101.

FIGS. 2A to 2D are block diagrams of a storage unit according to an exemplary embodiment of the present invention.

Referring to FIGS. 2A to 2D, the storage unit 103 includes a secondary storage unit 209 and a main memory device 211.

The main memory device 211 is a device for temporarily storing various data or programs read through an input device (not shown) of the terminal to support execution of the program. Further, the main memory device 211 provides a program or data necessary for the processing of the controller 101 and may re-store the result. In an exemplary implementation, the main memory device 211 has a smaller capacity than that of the secondary memory device 209, but has a faster processing rate. For example, the main memory device 211 may include a non-volatile memory type Read Only Memory (ROM) in which recorded contents are preserved even though power is cut or otherwise lost, and a volatile memory-type Random Access Memory (RAM) in which all contents are erased when power is off.

In an exemplary implementation, the secondary memory device 209 is a memory device used for supplementing a memory capacity shortage of the main memory device 211. In general, the secondary memory device 209 has a larger capacity, but has a slower rate of recording or reading data than the main memory device 211. For example, the secondary memory device 209 includes a floppy disk, a hard disk, and the like.

The secondary memory device 209 may include a code area 201, a constant area 203, a variable area 205, and an address table area 207. Here, the code area 201 is an area for storing a code of a specific program, and is generally marked with an indicator, "text". Further, the constant area 203 is an area for storing a constant of a specific program, and is marked with an indicator, ".rodata". Further, the variable area 205 is an area for storing a variable of a specific program, and is marked with an indicator, ".data". The address table area 207 is an area for storing addresses of an area in which specific data is located in the secondary memory device 209. Here, the specific data refers to data having a specific extension within a specific program. For example, the specific extension may be a file having an extension of "jpg", a file having an extension of "zip", and the like. However, the specific extension is not limited thereto.

Figure 2A:
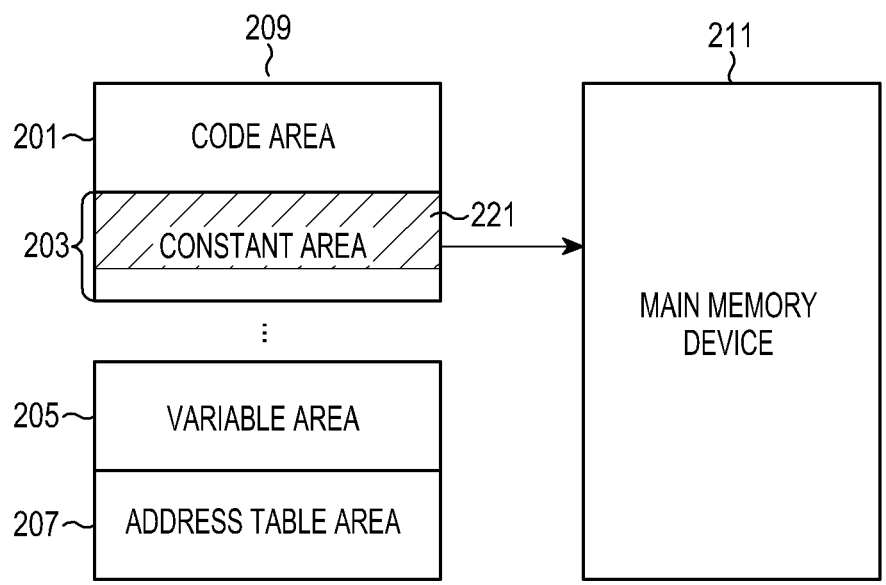
FIGS. 2A to 2D are block diagrams of a storage unit according to an exemplary embodiment of the present invention.

When a request for storing a specific program including a specific extension is made, the secondary memory device 209 stores the specific program. For example, when specific data having a specific extension is a constant as illustrated in FIG. 2A, the secondary memory device 209 may store the specific data of a specific program in a first area 221 of the constant area 203.

Figure 2B:
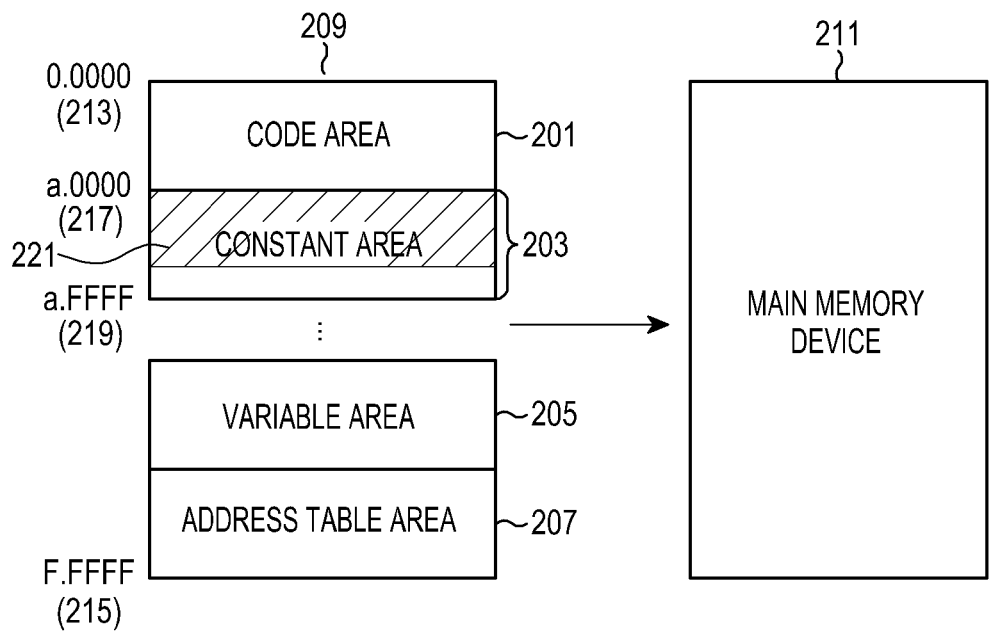

Further, the secondary memory device 209 assigns addresses in an entire storage space (an area including the code area 201, the constant area 203, the variable area 205, and the address table area 207). For example, as illustrated in FIG. 2B, the secondary memory device 209 may sequentially assign the addresses from a beginning point to a last point of the secondary memory device 209. Through the assignment operation of the address, the secondary memory device 209 may assign an address of 0.0000 213 to the beginning point of the secondary memory device 209, and assign an address of F.FFFF 215 to the last point of the secondary memory device 209. Further, the secondary memory device 209 may assign an address of a.0000 217 to the beginning point of the area in which the specific data is stored, and assign an address of a.FFFF 219 to the last point of the area in which the specific data is stored.

Further, the secondary memory device 209 identifies the addresses of the area in which the specific data is stored among the addresses assigned to the entire storage space. Further, the secondary memory device 209 initializes the specific program based on the identified addresses. Here, the initialization of the specific program refers to identifying a parameter for loading the specific extension within the specific program, and setting the identified parameter as an address of the beginning point of an area in which specific data is stored. For example, in a case where addresses of the beginning point and the last point of the area in which the specific data are stored is a.0000 217 and a.FFFF 219, the secondary memory device 209 may change a parameter for loading the specific data within the specific program to a.0000.

Figure 2C:
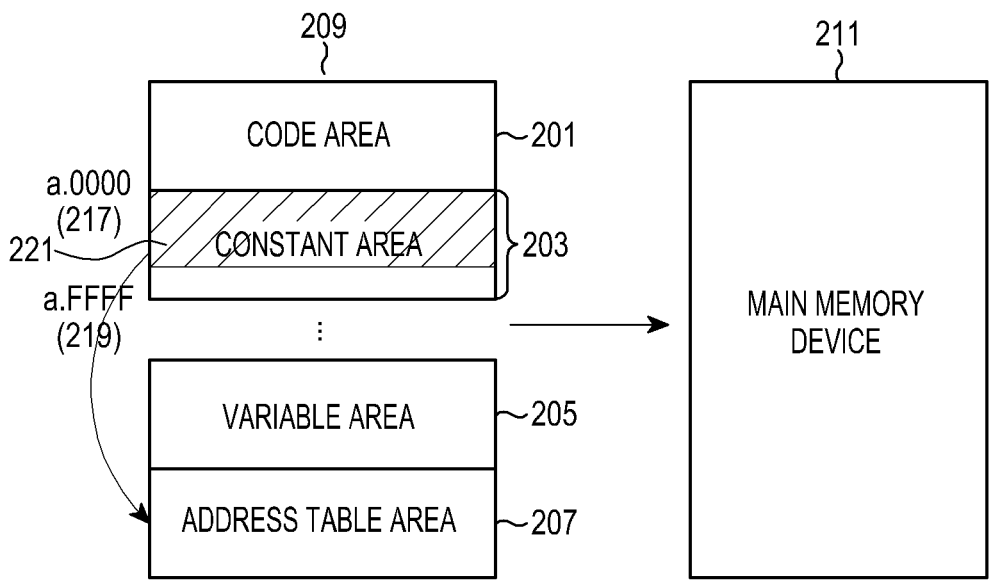
Figure 2D:
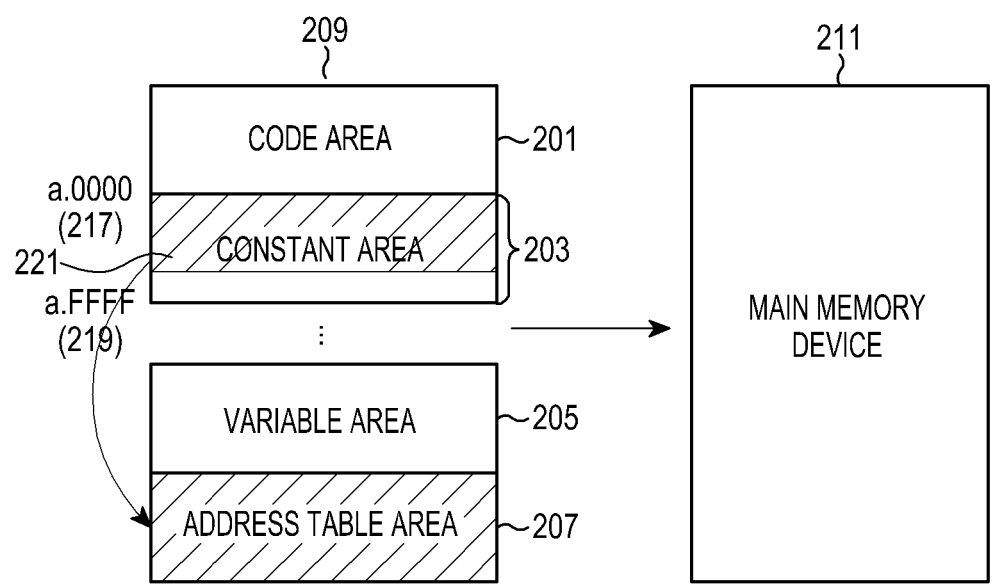

The secondary memory device 209 generates an address table for the specific extension based on the identified addresses, and stores the generated address table in the address table area 207. For example, in a case where addresses of the beginning point and the last point of the area in which specific extension is stored are a.0000 217 and a.FFFF 219, the secondary memory device 209 may generate an address table including a name of the specific data and the addresses (a.0000 217 and a.FFFF 219) of the beginning point and the last point as illustrated in FIG. 2C and store the generated address table in the address table area 207.

Further, when a request for execution of the specific program is made, the secondary memory device 209 detects an address table for the specific data from the address table area 207, and identifies a storage position of the specific data based on the detected address table. Further, the secondary memory device 209 detects the specific data from the identified storage position, and transmits the detected specific data to the main memory device 211. In this case, the secondary memory device 209 may transmit the specific data in the unit of a page or by an amount desired by the specific program.

For example, when the request for execution of the specific program is made, the secondary memory device 209 may identify the addresses (a.0000 217 and a.FFFF 219) of the specific data having the specific extension by detecting an address table corresponding to the specific data and analyzing the address table. Further, the secondary memory device 209 may detect the specific data included in the addresses from a.0000 217 and a.FFFF 219 based on the identified addresses (a.0000 217 and a.FFFF 219) and transmit the detected specific data to the main memory device 211.

FIGS. 3A and 3B are diagrams illustrating a format of an address table according to an exemplary embodiment of the present invention.

Referring to FIGS. 3A and 3B, in a case where specific data having a specific extension is continuously stored in the constant area 203, the secondary memory device 209 generates a first address table 301, and stores the generated first address table 301 in the address table area 207. Here, the first address table 301 includes a name (a.jpg) of first specific data name and first address information (a.0000 and a.FFFF). The first address information represents that the specific data is continuously stored from a.0000 to a.FFFF.

When the specific data having the specific extension is not continuously stored in the constant area 203, the secondary memory device 209 generates a second address table 303, and stores the generated second address table 303 in the address table area 207. Here, the second address table 303 includes a name (b.jpg) of second specific data and second address information (a.0000, a.BBBB, a.CCCC, and a.FFFF). The second address information represents that the specific data is stored from a.0000 to a.BBBB, and is not continuously stored from a.CCCC to a.FFFF.

Figure 4:
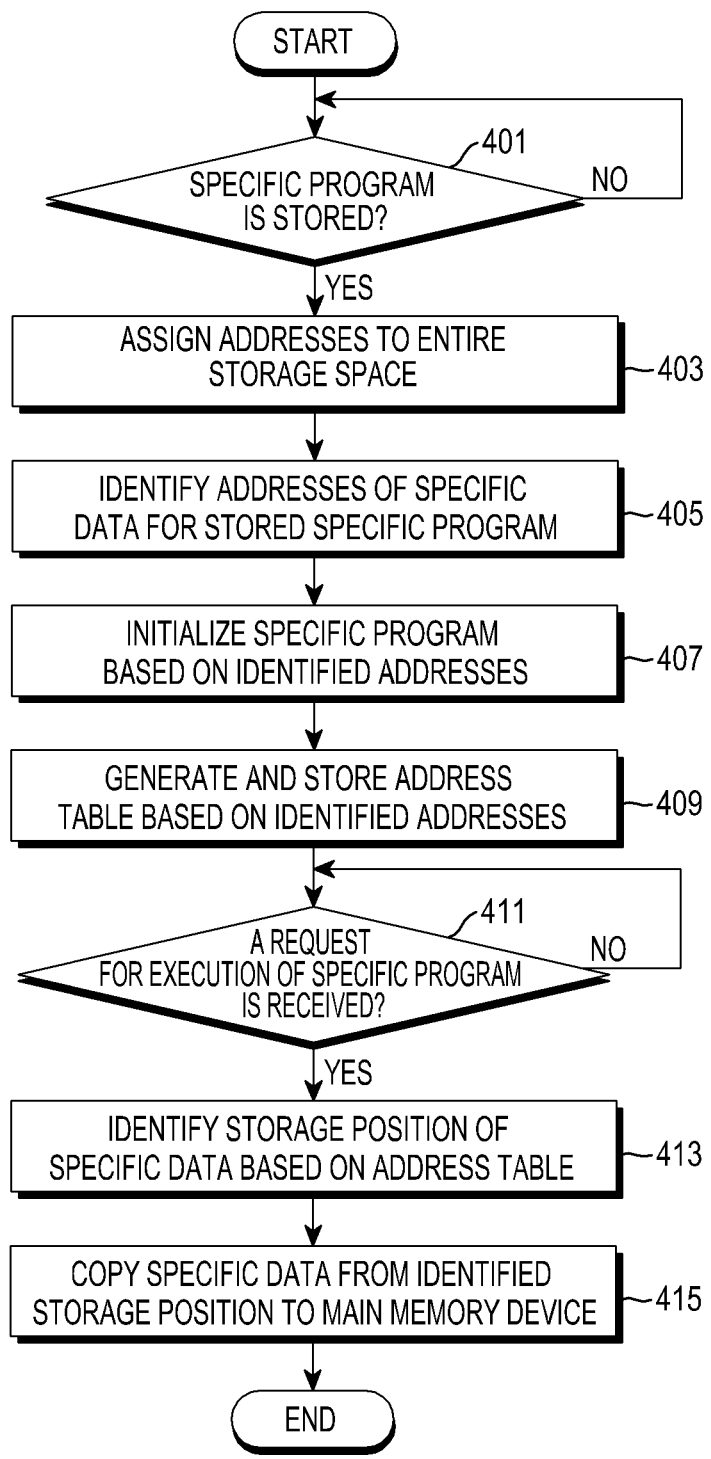
FIG. 4 is a flowchart for processing data by a secondary storage unit of a terminal according to an exemplary embodiment of the present invention.

FIG. 4 is a flowchart for processing data by a secondary storage unit of a terminal according to an exemplary embodiment of the present invention.

Referring to FIG. 4, in step 401, a secondary memory device identifies whether a request for storing a specific program including a specific extension is made. When the request for storing the specific program including the specific extension is made, the secondary memory device proceeds to step 403. However, when the request for storing the specific program including the specific extension is not made, the secondary memory device repeatedly performs step 401.

In step 403, the secondary memory device stores the specific program, assigns addresses to an entire storage space (the area including a code area, a constant area, a variable area, and an address table area), and proceeds to step 405. When a central processing unit is a processor of 64 bits, a range of the address may be extended to 16 exabytes, so that the secondary memory device may assign the address to the entire storage space.

For example, when specific data having a specific extension is a constant as illustrated in FIG. 2A, the secondary memory device may store the specific data of the specific program in the first area. For another example, when specific data having a specific extension is a variable, the secondary memory device may store the specific data of the specific program in a partial area of the variable area.

For example, as illustrated in FIG. 2B, the secondary memory device may sequentially assign addresses from a beginning point to a last point of the secondary memory device. Through the assignment operation of the addresses, the secondary memory device may assign an address of 0.0000 to the beginning point of the secondary memory device, and assign an address of F.FFFF to the last point of the secondary memory device. Further, the secondary memory device may assign an address of a.0000 to the beginning point of the area in which the specific data is stored, and assign the address of a.FFFF to the last point of the area in which the specific data is stored.

In step 405, the secondary memory device identifies the addresses of the area in which the specific data is stored among the addresses assigned to the entire storage space, and proceeds to step 407. In step 407, the secondary memory device initializes the specific program based on the identified addresses. Here, the initialization of the specific program refers to identifying a parameter for loading the specific extension within the specific program, and setting the identified parameter as an address of the beginning point of the area in which specific data is stored. For example, in a case where addresses of the beginning point and the last point of the area in which specific data are stored are a.0000 and a.FFFF, the secondary memory device may change a parameter for loading the specific data within the specific program to a.0000.

In step 409, the secondary memory device generates an address table for the specific extension based on the identified addresses, and stores the generated address table in the address table area. For example, in a case where addresses of the beginning point and the last point of the area in which the specific extension is stored are a.0000 and a.FFFF, the secondary memory device may generate an address table including a name of the specific data and the addresses (a.0000 and a.FFFF) of the beginning point and the last point as illustrated in FIG. 2C and store the generated address table in the address table area.

Through steps 401 to 409, the secondary memory device may not perform execution in place of the specific program, but may execute a preparation process (e.g., initialization of the specific program) for executing the specific program at an operation system level.

In step 411, the secondary memory device may identify whether a request for execution of the specific program is made. When the request for execution of the specific program is made as a result of the identification, the secondary memory device proceeds to step 413. However, when the request for execution of the specific program is not made, the secondary memory device repeatedly performs step 411. Here, the execution of the specific program is performed when the request for execution of the specific program is made by a user or when the terminal satisfies a predetermined execution condition of the specific program.

When the secondary memory device proceeds to step 413, the secondary memory device detects an address table for the specific data from the address table area and identifies a storage position of the specific data based on the detected address table. In step 415, the secondary memory device detects the specific data from the identified storage position, and transmits the detected specific data to the main memory device. In this case, the secondary memory device may transmit the specific data in units of a page or by an amount desired by the specific program.

For example, when the request for execution of the specific program is made, the secondary memory device may identify the addresses (a.0000 and a.FFFF) of the specific data having the specific extension by detecting an address table corresponding to the specific data and analyzing the address table. Further, the secondary memory device may detect the specific data included in the addresses from a.0000 and a.FFFF based on the identified addresses (a.0000 and a.FFFF) and transmit the detected specific data to the main memory device.

Through steps 401 to 413, the secondary memory device may minimize a delay time for the request for the execution of the specific program by shortening a time to load the specific program.

Through the operation, exemplary embodiments of the present invention provide an apparatus and a method of processing data in a terminal, thereby achieving an effect of minimizing a delay time for execution of a program. Further, exemplary embodiments of the present invention provide an apparatus and a method of processing data by using an address table in a terminal, thereby achieving an effect of minimizing a delay time for execution of a program.

An exemplary method of processing data in a terminal of the present invention may be implemented as a computer readable code in a computer readable recording medium. The computer readable recording medium includes every type of recording device in which data readable by a computer system is stored. An example of the recording medium includes a ROM, a RAM, an optical disk, a magnetic tape, a floppy disk, a hard disk, and a non-volatile memory, and also includes an implementation in a form of a carrier wave (for example, transmission through the Internet). Further, the computer readable recording medium is distributed to computer systems connected through a network, so that a computer readable code may be stored and extracted by a distribution method.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. An apparatus for processing data in a terminal, the apparatus comprising:
   a main memory device; and
   a secondary memory device configured to:
      assign addresses to each area of the plurality of areas for storing a specific program including specific data having a specific extension based on the specific extension,
      when the specific program is stored, identify addresses representing a position of an area in which the specific data having the specific extension is stored among the addresses assigned to each area,
      initialize the specific program based on the identified addresses,
      generate an address table based on the identified addresses,
      store the generated address table,
      identify at least one parameter for loading the specific extension within the specific program, and
      set the identified parameter as an address of a beginning point of the area in which the specific data is stored.

2. The apparatus of claim 1, wherein, when a request for execution of the specific program is made, the secondary memory device is further configured to detect the specific data based on the address table, and transmit the detected specific data to the main memory device.

3. The apparatus of claim 1, wherein the address table includes a name of the specific data, and an address of a beginning point and an address of a last point of the storage area in which the specific data is stored.

4. The apparatus of claim 1, wherein the secondary memory device is further configured to assign addresses to an entire storage space of the secondary memory device.

5. The apparatus of claim 1, wherein the secondary memory device is further configured to generate an address table based on the identified addresses, and store the generated address table in an address table area of the secondary memory device.

6. The apparatus of claim 1, wherein a processing speed of the main memory device is faster than a processing speed of the secondary memory device and the capacity of the main memory device is smaller than the capacity of the secondary memory device.

7. A method of processing data in a terminal, the method comprising:
   assigning addresses to each area of the plurality of areas for storing a specific program including specific data having a specific extension based on the specific extension;
   when the specific program is stored, identifying addresses representing a position of an area in which the specific data having the specific extension is stored among the addresses assigned to each area;
   initializing the specific program based on the identified addresses;
   generating an address table based on the identified addresses; and
   storing the generated address table,
   wherein initializing the specific program comprises:
      identifying at least one parameter for loading the specific extension within the specific program; and
      setting the identified parameter to an address of a beginning point of the area in which the specific data is stored.

8. The method of claim 7, further comprising:
   when a request for execution of the specific program is made, detecting the specific data based on the address table; and
   transmitting the detected specific data to a main memory device.

9. The method of claim 7, wherein the address table includes a name of the specific data, and an address of a beginning point and an address of a last point of an area in which the specific data are stored.

10. The method of claim 7, wherein the identifying of the addresses representing the position of specific data comprises:
    assigning addresses to the entire storage space of a secondary memory device.

11. The method of claim 7, wherein the generating of the address table and the storing of the generated address table comprises:
    generating an address table based on the identified addresses; and
    storing the generated address table in an address table area.

* * * * *